May 21, 1963  V. F. VOLK  3,090,825
INSULATED CABLE
Filed Dec. 29, 1959

INVENTOR.
VICTOR F. VOLK
BY

3,090,825
INSULATED CABLE

Victor F. Volk, Hastings on Hudson, N.Y., assignor to Anaconda Wire and Cable Company, a corporation of Delaware
Filed Dec. 29, 1959, Ser. No. 862,512
4 Claims. (Cl. 174—109)

This invention relates to electric cables and particularly to cables having conducting layers within the body of the insulation thereof.

It is an object of this invention to provide conducting layers in the insulation of an electric cable without appreciably increasing the thickness of said insulation.

Inclusion of conducting layers in the insulation of electric cables has not hitherto been practical because metal tapes strong enough to be applied with commercial taping machines are necessarily so thick that the cost and size of cables having insulation laminated with conducting tapes would be excessive.

On the other hand it has not been possible to make a cable by winding a conductor with known types of metal-paper laminates because the insulating properties of the paper were destroyed by the metal at the edges of any tapes cut from such laminates.

The present invention solves these problems by applying tapes of paper-metal laminate where the metal does not extend to the edges of the paper but leaves a non-conducting or very high resistance border on both edges. One such layer is applied with the metal side face up and the layer above it with the metal side face down. When, in such an arrangement, the tapes are staggered so that the gap between the conducting coating of one layer is bridged by the conducting coating of the facing layer a continuous metallic sheath will be formed between the two layers of insulation.

A more thorough understanding of the invention will result from consideration of the drawing.

Figure 1:
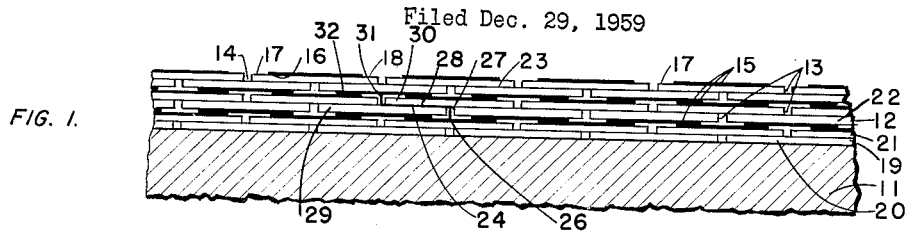
FIG. 1 is a lengthwise fragmentary sectional view of a cable conductor and the first few layers of insulation applied in accordance with the teachings of this invention.

Referring to FIG. 1 a conductor 11 is shown with a spiral wrapping of insulating tape. The conductor 11 is usually copper or aluminum but may be made of other metals or even non-metals that have been rendered electrically conducting by methods known to the art. The conductor 11 may be a smooth surfaced solid wire or tube but is more likely to consist of a number of wires stranded together. When the conductor 11 is stranded it is usually overwrapped with a flexible conducting or semiconducting tape. When such tape is used it is understood to form part of the conductor 11 in the meaning of the drawings.

Insulating tapes 12 are spirally wound over the conductor 11. The tapes 12 may be paper, polyethylene, polyethylene terephthalate, or other dielectric material and may be saturated with insulating oil prior to or after the taping operation. The insulating tapes 12 are usually 3 to 8 mils in thickness for conventional paper-insulated cables but may be as thin as a fraction of a mil when made of material like polyethylene terephthalate of high tensile strength and may be considerably thicker than 8 mils when made of very flexible material, like rubber.

The insulating tapes 12 may be applied with an overlap, or with their edges 13 butted together. Usually, however, a gap 14 is allowed between adjacent edges 13 to permit bending of the conductor 11 without buckling the tapes 12.

The layers of insulating tape 12 are staggered so that the gaps 14 of one layer are offset from the gaps 14 of the adjacent underlying layer.

The tapes 12 are coated on one side with a coating of conducting material 15 in such a way that the uncoated margins 17, 18 are left on the surface of the tape. The coating of conducting material 15 may be aluminum or other metal foil bonded to the insulating tapes 12 by means of a suitable adhesive 16 or it may be conducting paint or metal applied as a spray by methods known to persons skilled in metal coating. It is also known to apply metallic coatings by evaporating suitable metals in proximity to the material to be coated in vacuo and the coating 15 may be applied by this method.

Reference to FIG. 1 shows an initial layer 19 over the conductor 11 of the insulating tape 20 free from conducting coating. Alternatively the initial layer may consist of the insulating tape 12 coated with conducting material 15 and applied with the conducting material 15 facing the conductor 11.

A second layer 21 of the insulating tapes 12 with the conducting coating 15 is applied over the initial layer 19 so that the gaps 14 in layer 19 occur approximately midway of the width of the tapes 12. The insulating tapes 12 of the second layer 21 are applied with the conducting coatings 15 facing outwardly from the conductor 11.

A third layer 22 of the insulating tapes 12 with the conducting coating 15 is applied with the conducting coating 15 facing inwardly toward the conductor 11 and making electrical contact with the conducting material of the tapes 12 of the layer 21. The tapes 12 of the third layer 22 are applied so that the gaps 14 in the layer 21 occur approximately midway of the width of the tapes 12 of the layer 22. The width of the conducting material 15 is great enough so that the conducting material facing inwardly in each layer will bridge the space between the outwardly facing conducting material on adjacent turns of the tape on the next inwardly layer. The conducting material on the tapes 12 of the layers 21 and 22 are thus seen to form a continuous conducting tube around the conductor and insulating material enclosed within the layer 22.

The configurations of the layers 21 and 22 are repeated by additional wrappings of the insulating tapes 12 until the combined dielectric strength of the insulating layers reaches any predetermined value. The configuration of alternately inwardly facing and outwardly facing conducting material 15 of the insulating tape 12 shown in FIG. 1 may be repeated to build up the entire insulation of an electric cable or the configuration of FIG. 1 may be applied until the insulation has reached some predetermined thickness after which additional layers of the insulating tapes 20 free from conducting material may be applied. This might be done because the electrical stress in a cable is always greatest in the layers of insulation closest to the conductor.

Dielectric strength against rupture through insulating material of the tapes 12 and 20 is usually greater than the strength across the gaps 14 or along the surfaces 23 and the edges 13 of the tapes 12 and 20. The dielectric strength of the gaps 14 may be increased by the use of insulating oils or gases but it is desirable that the electrical pathway between conducting layers through the gaps 14 be in series with a long length of the surface 23. The heavy line 24 of FIG. 1 shows such a hypothetical electrical pathway, extending from the center of the conducting strip 26 through the gap 27 along the intersurface 28 between the tapes 29 and 30, through the gap 31 to the center of the conducting strip 32. The length of the hypothetical pathway 24 is thus seen to include one-half of the width of a tape 12 plus two tape thicknesses.

Figure 2:
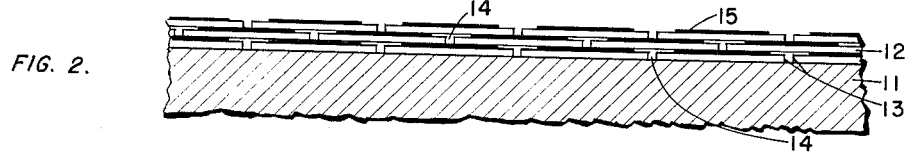
FIG. 2 is a lengthwise fragmentary sectional view of a cable conductor and the first few layers of insulation applied in accordance with another embodiment of the teachings of this invention.

In FIG. 2 the conducting material 15 of the tapes 12 faces in the same direction on all layers. The dielectric strength of insulation applied in the configuration of FIG. 2 will be no greater than the strength of the gaps 14 but the configuration of FIG. 2 may permit easier penetration by insulating fluids.

Figure 3:
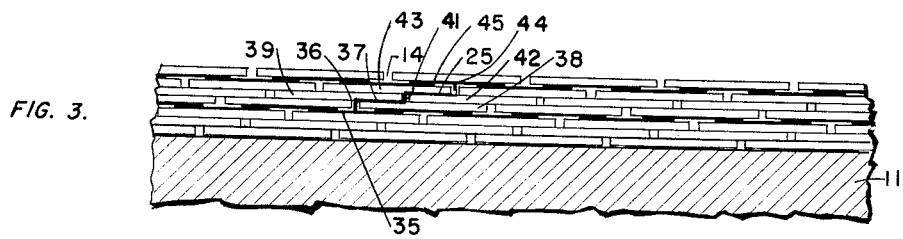
FIG. 3 is a lengthwise fragmentary sectional view of a cable conductor and the first few layers of insulation applied in accordance with still another embodiment of the teachings of this invention.

In FIG. 3 one or more layers of the uncoated tape 20 are wound between the layers of the coated tapes 12. In the taping configuration of this figure the heavy line 25 shows that the hypothetical electrical pathway through the gaps 14 can be increased to include two-thirds of a width of the tape 15 by including one or more layers of the insulating tapes 20 free from conducting material between the conducting surfaces and advancing the tapes one-third of a tape width each layer. In this case the hypothetical pathway extends from a point on the conducting strip 35 through the gap 36 along the intersurface 37 between the tape 38 and the tape 39, through the gap 41, along the intersurface between the tapes 42 and 43 through the gap 44 to the conducting strip 45.

Figures 4, 5:
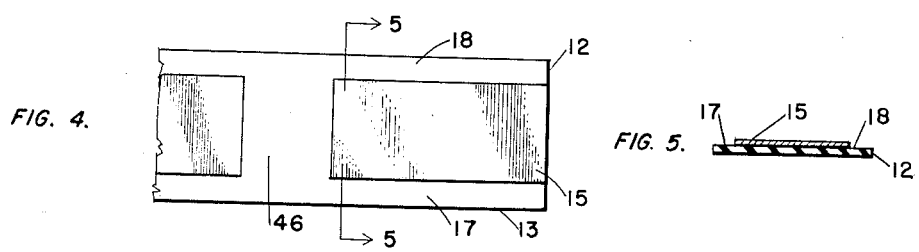
FIG. 4 is a plan view of a length of insulating tape prepared in accordance with the teachings of this invention.
FIG. 5 is a section through the lines 5—5 of FIG. 4.

The dielectric strength within the gaps 14 of all the structures of FIGS. 1 through 3 is seen to contribute substantially to the total dielectric strength of the cable insulation and it is important that no conducting material should penetrate into the gaps 14 or along the edges 13. By using the insulating tapes 12 with the conducting material 15 that leaves margins 17, 18 as shown in FIG. 4 this invention has eliminated the loss of insulation at the edges of the tape due to folding or contamination of the edges in the tape-slitting operation.

Foil-backed paper tapes such as those used for cable shielding are manufactured by slitting wide sheets of laminated paper foil. Where such tapes have been used on cable there has been no effort to utilize the insulating properties of the paper portion of the paper-foil laminate and the required thickness of a cable insulation has been calculated without regard to any possible contribution from the laminated layers.

It is not possible to slit wide sheets of paper foil and still retain the insulating properties of the paper because of metal contamination of the paper edges. If the laminate is slit from the foil edge downwardly into the paper, particles of metal from the foil will be carried over the edges of the newly formed tapes. If, on the other hand, the paper is slit from the paper side into the foil, metal particles from the foil will adhere to the slitting knives and come off the knives to contaminate fresh edges of paper.

Cable made according to the teachings of this invention will have no sharp metallic particles at the edges of the gaps between tapes to serve as points for corona discharges.

The conducting coating 15 can be applied to the insulating tape 12 in coatings so that no appreciable thickness is added to the cable insulation.

As a practical matter 2-mil thick copper tape would be a minimum that could be applied to cable on standard paper insulating machinery. If it were desired to build a cable having the configuration of FIG. 1 using copper tapes instead of the laminates of the invention, two copper tape thicknesses would be required for each two thicknesses of paper insulation. Considering the case where 360 mils of insulation thickness were required, built up of 4 mil paper tapes there would be 4 mils of copper thickness for each 8 mils of paper. The overall thickness of the insulation would thus have to be 540 mils. When laminated tapes are used for the configuration of FIG. 1 aluminum foils no more than ¼ mil in thickness can be applied on conventional taping equipment. The increase in insulation wall thickness due to the conducting layers would be 22.5 mils in the above example if 4 mil paper tape with ¼ mil foil strips were used to build up a wall of 360 mils of paper. Total thickness of the insulation would thus be 382.5 mils instead of the 480 mils thickness when copper tapes were used. The thickness added by the conducting layers is even less when the metal is deposited as a spray or by metal vaporizing techniques.

Difficulty of application is not the only obstacle to the construction of a laminated electric cable by the direct application of very thin metal tapes. Even if special machinery were devised to apply foil wrappings directly between layers of insulation, such foils would tend to wrinkle and buckle during flexings and expansions and contractions of the cable and to work down between the gaps 14 destroying the dielectric properties of the gaps 14.

When cable is made according to the teachings of this invention it may be desirable to have discontinuities in the conducting paths formed by individual conducting layers. This may be particularly true for very long cable lengths where, although the statistical probability of having a short between any two adjacent conducting layers is very small, enough such faults might occur due to the extreme length of the cable to form a continuous conducting path through the insulation thickness.

Such a discontinuity may be easily formed by interrupting the process of applying conducting material to the insulating tape to leave nonconducting area 46 (FIG. 4) by removing conducting material that had been applied to the tape, or by interposing short lengths of insulating tape free from conducting material in the process of applying the tape to the cable.

Figure 6:
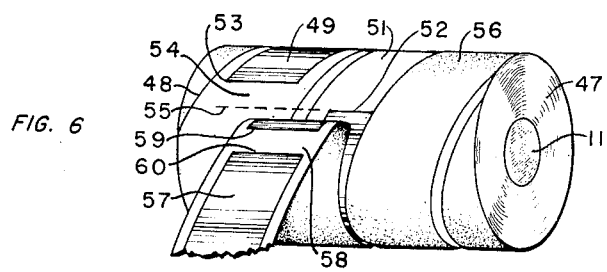
FIG. 6 is a fragmentary perspective view of cable having a portion of the insulating tape cut away and folded back to expose a feature of this invention.

FIG. 6 shows a method for introducing a discontinuity when coated tapes are applied with their conducting surfaces face to face. In the illustration the conductor 11 has been covered with a plurality of tapes to build up a core 47, a tape 48 with an outwardly facing coating 49 has been applied having an uncoated length 51 extending more than one full turn around the core 47. The edge 52 marks the termination of the coating 49 on one turn of the tape 48 and the edge 53 marks the termination of the coating 49 on an adjacent turn of the same tape. There is a gap 54 between the edge 49 and the imaginary line 55 extending the edge 52 along the length of the core 47. A coated tape 56 with conducting coating 57 facing inwardly has been wrapped over the tape 48 and stripped back to expose an uncoated length 58 defined by edges 59, 60 of the coating 57. Tape 56 is so applied that a portion of the uncoated length 58 in the inwardly facing tape 56 is wrapped directly above the portion of the gap 54 in the outwardly facing tape 48.

From a study of FIG. 6 it will be apparent that there will be no conducting path lengthwise of the core across the discontinuity formed by the facing uncoated lengths 51 and 58 of the tapes 48 and 56. The uncoated length 51 of the outwardly facing tape 48 can be decreased to a length less than one turn around the core 47 by moving the edge 52 closer to the edge 53 and correspondingly increasing the uncoated length 58 of the inwardly facing tape 56 by moving the edge 60 away from the edge 59.

I claim:
1. An electric cable comprising a conductor, insulating tapes wrapped helically around said conductor, electrically conducting material on one surface of said insulating tapes, said conducting material having a width less than the width of said insulating tapes and having side edges spaced inwardly from both edges of said tapes, at least one of said insulating tapes having said conducting material facing outwardly, said tape having a length free from conducting material, another directly overlying of said tapes having said conducting material facing inwardly and in electrical contact with said outwardly facing conducting material, said inwardly and outwardly facing conducting material forming a conducting layer around said cable, said other tape having a length free from conducting material, the combined length of tape free from conducting material exceeding the length of one turn of said tapes around said cable, said length free from conducting material of one of said tapes being in contact with said length free from conducting material of the overlying of said tapes, said tapes being disposed so as to form an electrical discontinuity in the cable layer formed by said inwardly and outwardly facing conducting materials.

2. The electric cable of claim 1 wherein the insulating tapes are polyethylene terephthalate.

3. The electric cable of claim 1 wherein the insulating tapes are polyethylene.

4. The electric cable of claim 1 wherein the electrically conducting material is aluminum foil.

References Cited in the file of this patent

UNITED STATES PATENTS

| | | |
|---|---|---|
| 1,775,072 | Simmons | Sept. 2, 1930 |
| 2,260,845 | Urmston | Oct. 28, 1941 |
| 2,286,052 | Beaver et al. | June 9, 1942 |
| 2,344,501 | Bennett | Mar. 21, 1944 |
| 2,447,168 | Dean et al. | Aug. 17, 1948 |

FOREIGN PATENTS

| | | |
|---|---|---|
| 479,481 | Great Britain | Feb. 7, 1938 |